(12) United States Patent
Merlo et al.

(10) Patent No.: US 9,947,952 B2
(45) Date of Patent: Apr. 17, 2018

(54) FLUOROIONOMERS DISPERSIONS HAVING A LOW SURFACE TENSION, LOW LIQUID VISCOSITY AND HIGH SOLID CONTENT

(71) Applicant: SOLVAY SPECIALTY POLYMERS ITALY S.P.A., Bollate (IT)

(72) Inventors: Luca Merlo, Montorfano (IT); Alessandro Ghielmi, Frankfurt am Main (DE); Vincenzo Arcella, Nerviano (IT)

(73) Assignee: SOLVAY SPECIALTY POLYMERS ITALY S.P.A., Bollate (MI) (IT)

( * ) Notice: Subject to any disclaimer, the term of this patent is extended or adjusted under 35 U.S.C. 154(b) by 0 days.

(21) Appl. No.: 15/238,385

(22) Filed: Aug. 16, 2016

(65) Prior Publication Data

US 2017/0194661 A1    Jul. 6, 2017

Related U.S. Application Data

(62) Division of application No. 13/376,641, filed as application No. PCT/EP2010/058182 on Jun. 10, 2010, now Pat. No. 9,450,262.

(30) Foreign Application Priority Data

Jun. 12, 2009 (EP) .................................. 09162625

(51) Int. Cl.
| | | |
|---|---|---|
| *H01M 8/10* | (2016.01) | |
| *B01J 39/20* | (2006.01) | |
| *C08J 5/22* | (2006.01) | |
| *H01M 8/1039* | (2016.01) | |
| *H01M 8/106* | (2016.01) | |
| *H01M 8/1018* | (2016.01) | |

(52) U.S. Cl.
CPC .......... *H01M 8/1039* (2013.01); *B01J 39/20* (2013.01); *H01M 8/106* (2013.01); *C08J 2327/18* (2013.01); *H01M 2008/1095* (2013.01)

(58) Field of Classification Search
CPC .............. H01M 8/1039; H01M 8/106; H01M 2008/1095; B01J 39/20; C08J 5/2281; C08J 2327/18
USPC ...................................... 428/172; 521/27, 38
See application file for complete search history.

(56) References Cited

U.S. PATENT DOCUMENTS

| | | | |
|---|---|---|---|
| 3,282,875 A * | 11/1966 | Connolly | .............. C07C 309/82 524/795 |
| 4,433,082 A | 2/1984 | Grot | |
| 6,150,426 A | 11/2000 | Curtin et al. | |
| 7,214,740 B2 | 5/2007 | Lochhaas et al. | |
| 7,304,101 B2 | 12/2007 | Hintzer et al. | |
| 7,482,415 B2 | 1/2009 | Tatemoto et al. | |
| 7,838,167 B2 * | 11/2010 | Hommura | .............. C08F 214/18 429/494 |
| 2006/0014887 A1 | 1/2006 | Hamrock et al. | |
| 2008/0292935 A1 | 11/2008 | Roelofs | |

FOREIGN PATENT DOCUMENTS

| | | | | |
|---|---|---|---|---|
| EP | 1004615 | A2 | 5/2000 | |
| EP | 1256591 | A1 | 11/2002 | |
| EP | 1635412 | A1 | 3/2006 | |
| EP | 1666508 | A1 | 6/2006 | |
| EP | 1798793 | A1 * | 6/2007 | ............ C08F 214/18 |
| GB | 1286859 | A | 8/1972 | |
| WO | 08077894 | A1 | 3/2008 | |
| WO | 08046816 | A1 | 4/2008 | |
| WO | 08054420 | A2 | 5/2008 | |

\* cited by examiner

*Primary Examiner* — Michael M Bernshteyn

(57) ABSTRACT

The invention pertains to a process for manufacturing certain (per)fluoroionomer liquid compositions, comprising, inter alia, at least one of fluorination and treatment with a polar solvent, to the liquid compositions therefrom having an improved solids content/surface tension/liquid viscosity compromise, to the use of the same for manufacturing composite membranes and to composite membranes obtainable therefrom.

10 Claims, 1 Drawing Sheet

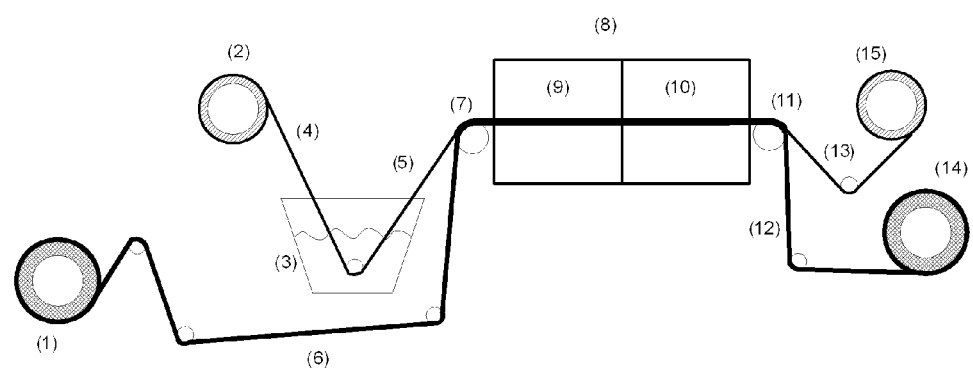

FLUOROIONOMERS DISPERSIONS HAVING A LOW SURFACE TENSION, LOW LIQUID VISCOSITY AND HIGH SOLID CONTENT

CROSS-REFERENCE TO RELATED APPLICATIONS

This application is a divisional application of U.S. application Ser. No. 13/376,641, filed Dec. 7, 2011 and issued as U.S. Pat. No. 9,450,262, which is a U.S. national stage entry under 35 U.S.C. § 371 of International Application No. PCT/EP2010/058182 filed Jun. 10, 2010, which claims priority to European application No. 09162625.9 filed on Jun. 12, 2009. The entire contents of these applications are explicitly incorporated herein by this reference.

The invention pertains to a process for manufacturing fluoroionomer dispersions having low surface tension, low liquid viscosity and high solid content, to said fluoroionomer dispersions, to their use for the manufacture of composite membranes and to the composite membranes therefrom.

BACKGROUND ART

Liquid compositions of (per)fluorinated ion exchange polymers are known for use in the manufacture, and possibly repair, of ion exchange membranes, for membrane coatings containing conductive and non-conductive particles, and for many other uses. While such compositions are sometimes referred to as solutions, the compositions are generally recognized as being dispersions (in other words, colloidal suspensions) of polymer particles.

Liquid compositions are typically prepared by dissolving/suspending in an appropriate aqueous or aqueous-alcoholic medium the (per)fluorinated ion exchange polymer. Methods useful for obtaining such liquid dispersions are notably taught in U.S. Pat. No. 4,433,082 (DUPONT DE NEMOURS) 21 Feb. 1984, GB 1286859 (DU PONT) 23 Aug. 1972, EP 1004615 A (AUSIMONT S.P.A.) 31 May 2000 and U.S. Pat. No. 6,150,426 (DUPONT DE NEMOURS) 21 Nov. 2000.

Nevertheless, said liquid compositions generally suffer of a poor compromise between liquid viscosity, surface tension and solids contents. Actually, it is generally understood that for achieving optimal impregnation of porous support it is important to:
- reduce liquid viscosity, so as to maximize penetration ability of the liquid in the porosity of the support and to limit thickness of membrane thereof;
- reduce surface tension, so as to increase wettability towards low surface tension supports, usually ePTFE;
- increase solids content, so as to maximize coated/impregnated amount of (per)fluoroionomer, remaining in the porous support structure after solvent evaporation.

Failure to simultaneously comply with all above mentioned requirements in the dispersion typically provides in the eventual impregnation step a porous support with an uneven fluoroionomer distribution.

Typically, in liquid compositions of the prior art, reduction of the surface tension is obtained by addition of polar organic solvents (e.g. alcohols) or surfactants: nevertheless this addition typically gives rise to a simultaneous increase in liquid viscosity, which is detrimental for the impregnation process and which prevents from simultaneous increase of solids, this latter parameter being responsible of further increases in liquid viscosity.

Also, techniques are known according to which (per)fluoroionomers are submitted to particular treatment for improving certain performances, in particular in their fuel cells operations.

Thus, documents US 2008292935 (DU PONT DE NEMOURS) 27 Nov. 2008 and WO 2008/054420 (DU PONT DE NEMOURS) 5 Aug. 2008 disclose a process for manufacturing certain fluoroionomer dispersions comprising, inter alia, fluorinating a fluoroionomer and dispersing said fluorinated fluoroionomer in a water/alcohol mixture, as described in U.S. Pat. No. 4,433,082 (DUPONT DE NEMOURS) 21 Feb. 1984.

Nevertheless, so obtained dispersions fail to provide an improved surface tension/liquid viscosity/solids content compromise and thus are unsuitable for manufacturing composite membranes having a homogenous content of the fluoroionomer through the porous support thickness.

BRIEF DESCRIPTION OF THE DRAWINGS

FIG. 1 is a graphic depiction of a particular embodiment of the process for manufacturing a composite membrane disclosed herein.

DISCLOSURE OF INVENTION

The Applicant has now found that by adopting a particular technique in the manufacture of the liquid composition, it is possible to obtain (per)fluoroionomer dispersions fulfilling above mentioned requirements, and which are thus suitable for manufacturing composite membranes having a homogenous distribution of the (per)fluoroionomer through the entire thickness of the porous support and high content of fluoroionomer contained in the support porosity.

Also, (per)fluoroionomer dispersions of the present invention have been found suitable for manufacturing of composite membranes via a single-step impregnation process, thus making it possible to produce these membranes via suitable high throughput continuous processes.

It is thus a first object of the present invention a process for manufacturing a (per)fluoroionomer liquid composition having a (per)fluoroionomer content of at least 9% wt, with respect to the total weight of the composition, said process comprising:
  providing a (per)fluoroionomer (I);
  submitting said (per)fluoroionomer (I) to at least one of:
  (A) fluorination with elemental fluorine;
  (B) treatment with a polar organic solvent [solvent (S)];
  and separating said (per)fluoroionomer (I) for recovering a purified (per)fluoroionomer (I);
  dispersing said (per)fluoroionomer (I) at a temperature of at least 150° C. in an aqueous medium substantially free from organic solvents, for obtaining an aqueous composition;
  adding to said composition at least one polar organic solvent [solvent (S')].

To the purpose of the present invention, the term "(per)fluoroionomer (I)" is intended to denote any polymer comprising:
  recurring units derived from at least one ethylenically unsaturated monomer comprising at least one fluorine atom (fluorinated monomer, hereinafter); and
  a substantial amount of recurring units derived from at least one ethylenically unsaturated monomer comprising at least one cation exchange group or a precursor thereof (functional monomer, hereinafter).

The term "at least one ethylenically unsaturated monomer comprising at least one fluorine atom [fluorinated monomer]" is understood to mean that the fluoroionomer can comprise recurring units derived from one or more than one fluorinated monomer.

In the rest of the text, the expression "fluorinated monomer" is understood, for the purposes of the present invention, both in the plural and the singular.

The fluorinated monomer can further comprise one or more other halogen atoms (Cl, Br, I). Shall the fluorinated monomer be free of hydrogen atom, it is designated as per(halo)fluoromonomer. Shall the fluorinated monomer comprise at least one hydrogen atom, it is designated as hydrogen-containing fluorinated monomer.

Non limitative examples of fluorinated monomers are notably tetrafluoroethylene (TFE), vinylidene fluoride (VdF), chlorotrifluoroethylene (CTFE), and mixtures thereof.

Optionally, the (per)fluoroionomer (I) may comprise recurring units derived from one first monomer, said monomer being a fluorinated monomer as above described, and at least one other monomer [comonomer (CM), hereinafter].

Hereinafter, the term comonomer (CM) should be intended to encompass both one comonomer and two or more comonomers.

The comonomer (CM) can notably be either hydrogenated (i.e. free of fluorine atom) [comonomer (HCM), hereinafter] or fluorinated (i.e. containing at least one fluorine atom) [comonomer (FCM), hereinafter].

Non limitative examples of suitable hydrogenated comonomers (HCM) are notably ethylene, propylene, vinyl monomers such as vinyl acetate, acrylic monomers, like methyl methacrylate, acrylic acid, methacrylic acid and hydroxyethyl acrylate, as well as styrene monomers, like styrene and p-methylstyrene.

Non limitative examples of suitable fluorinated comonomers (FCM) are notably:

$C_3$-$C_8$ fluoro- and/or perfluoroolefins, such as hexafluoropropene, pentafluoropropylene, and hexafluoroisobutylene;

$C_2$-$C_8$ hydrogenated monofluoroolefins, such as vinyl fluoride;

1,2-difluoroethylene, vinylidene fluoride and trifluoroethylene;

perfluoroalkylethylenes complying with formula $CH_2=CH-R_{f0}$, in which $R_{f0}$ is a $C_1$-$C_6$ perfluoroalkyl;

chloro- and/or bromo- and/or iodo-$C_2$-$C_6$ fluoroolefins, like chlorotrifluoroethylene;

fluoroalkylvinylethers complying with formula $CF_2=CFOR_{f1}$ in which $R_{f1}$ is a $C_1$-$C_6$ fluoro- or perfluoroalkyl, e.g. $-CF_3$, $-C_2F_5$, $-C_3F_7$;

fluoro-oxyalkylvinylethers complying with formula $CF_2=CFOX_0$, in which $X_0$ is a $C_1$-$C_{12}$ oxyalkyl, or a $C_1$-$C_{12}$ (per)fluorooxyalkyl having one or more ether groups, like perfluoro-2-propoxy-propyl;

fluoroalkyl-methoxy-vinylethers complying with formula $CF_2=CFOCF_2OR_{f2}$ in which $R_{f2}$ is a $C_1$-$C_6$ fluoro- or perfluoroalkyl, e.g. $-CF_3$, $-C_2F_5$, $-C_3F_7$ or a $C_1$-$C_6$ (per)fluorooxyalkyl having one or more ether groups, like $-C_2F_5-O-CF_3$;

fluorodioxoles, of formula:

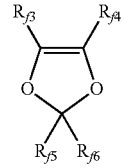

wherein each of $R_{f3}$, $R_{f4}$, $R_{f5}$, $R_{f6}$, equal or different each other, is independently a fluorine atom, a $C_1$-$C_6$ fluoro- or per(halo)fluoroalkyl, optionally comprising one or more oxygen atom, e.g. $-CF_3$, $-C_2F_5$, $-C_3F_7$, $-OCF_3$, $-OCF_2CF_2OCF_3$.

The term "substantial amount" in the definition here above is intended to denote an amount of recurring units derived from the functional monomer which is effective to modify the polymer in its properties. Generally, a substantial amount is of at least 1% by moles, based on the total moles of recurring units.

As used herein, the term "cation exchange group" has its general meaning as intended in organic chemistry and it encompasses atoms or combination of atoms bonded to the carbon skeleton of the ethylenically unsaturated monomer, which confer to said ethylenically unsaturated monomer ability to trap and release (i.e. exchange) cations in a process called ion exchange. Generally cation exchange groups are negatively charged moieties. Precursors of said cation exchange groups are, within the frame of present invention, those groups which, upon hydrolysis, provide for said cation exchange groups.

Non limitative examples of cation exchange groups and precursors thereof are notably those complying with formula:

—$SO_2X$, wherein X is chosen among halogens (Cl, F, Br, I), —$O^-M^+$, wherein $M^+$ is a cation selected among $H^+$, $NH_4^+$, $K^+$, $Li^+$, $Na^+$, or mixtures thereof;

—COY, wherein Y is chosen among halogens (Cl, F, Br, I); —$O^-M^+$, wherein $M^+$ is a cation selected among $H^+$, $NH_4^+$, $K^+$, $Li^+$, $Na^+$; —$OR_{Hy}$ wherein $R_{Hy}$ is a $C_1$-$C_6$ hydrocarbon group; —$OR_{Hf}$ wherein $R_{Hf}$ is a $C_1$-$C_6$ fluorocarbon or per(halo)fluorocarbon group; —$N(R_{Hy}*)_2$, wherein $R_{Hy}*$, equal or different at each occurrence, is hydrogen or a $C_1$-$C_6$ hydrocarbon group, or mixtures thereof;

—$PO_2Z$, wherein Z is chosen among halogens (Cl, F, Br, I); —$O^-M^+$, wherein $M^+$ is a cation selected among $H^+$, $NH_4^+$, $K^+$, $Li^+$, $Na^+$; —$OR_{Hy}$, wherein $R_{Hy}$ is a $C_1$-$C_6$ hydrocarbon group, and —$OR_{Hf}$, wherein $R_{Hf}$ is a $C_1$-$C_6$ fluorocarbon or per(halo)fluorocarbon group, or mixture thereof.

Should the functional monomer comprise [in addition to fluorine atoms optionally comprised in the functional group] at least one fluorine atom which is not comprised in the functional group, it is designated as fluorinated functional monomer. Should the functional monomer be free of fluorine atoms other than those optionally comprised in the functional group, it is designated as hydrogenated functional monomer.

The fluorinated monomer and the fluorinated functional monomer may be the same monomer or may be different monomers, that is to say that the (per)fluoroionomer (I) can be a homopolymer of a fluorinated functional monomer, or can be a copolymer of one or more than one fluorinated monomer and one or more than one functional monomer, fluorinated or hydrogenated.

Preferably, the (per)fluoroionomer (I) comprises recurring units derived from at least one fluorinated functional monomer chosen among:

(M1) sulfonated perfluoroolefin of formula (M1):

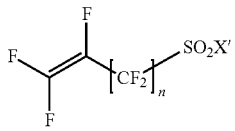
(M1)

wherein n is an integer between 0 and 6 and X' is chosen among halogens (Cl, F, Br, I), —O⁻M⁺, wherein M⁺ is a cation selected among H⁺, NH$_4^+$, K⁺, Li⁺, Na⁺, or mixtures thereof, preferably X'=—O⁻H⁺; preferred sulfonated perfluoroolefin are those complying with formulae (M1-A) and (M1-B):

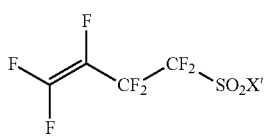
(M1-A)

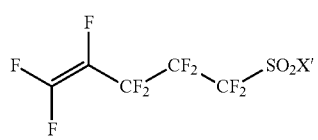
(M1-B)

wherein X' has the same meaning as above defined;

(M2) sulfonated perfluorovinylethers of formula (M2):

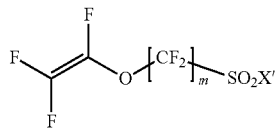
(M2)

wherein m is an integer between 1 and 10 and X' is chosen among halogens (Cl, F, Br, I), —O⁻M⁺, wherein M⁺ is a cation selected among H⁺, NH$_4^+$, K⁺, Li⁺, Na⁺, or mixtures thereof, preferably X'=—O⁻H⁺; preferred are sulfonated perfluorovinylethers of formulae (M2-A), (M2-B) and (M2-C):

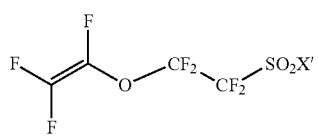
(M2-A)

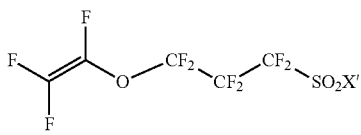
(M2-B)

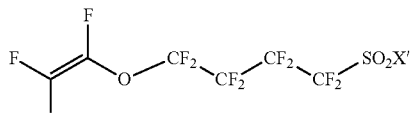
(M2-C)

wherein X' has the same meaning as above defined; most preferably, the sulfonated perfluorovinylether is perfuoro-5-sulphonylfluoride-3-oxa-1-pentene (also known as "SFVE") of formula (M2-D):

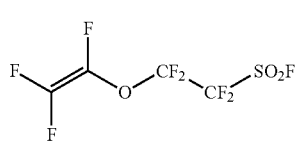
(M2-D)

which can be in its —SO$_2$F form or, preferably, in any of the —SO$_2$X' forms, as above detailed, more preferably in its —SO$_3$H form.

(M3) sulfonated perfluoroalkoxyvinylethers of formula (M3):

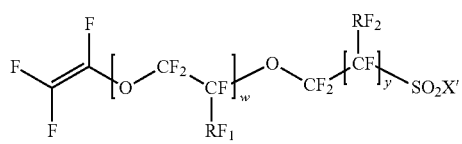
(M3)

wherein w is an integer between 0 and 2, RF$_1$ and RF$_2$, equal or different from each other and at each occurrence, are independently —F, —Cl or a C$_{1-10}$ perfluoroalkyl group, optionally substituted with one or more ether oxygens, y is an integer between 0 and 6 and X' is chosen among halogens (Cl, F, Br, I), —O⁻M⁺, wherein M⁺ is a cation selected among H⁺, NH$_4^+$, K⁺, Li⁺, Na⁺, or mixtures thereof; preferably X' is —O⁻H⁺; preferred sulfonated perfluoroalkoxyvinylether complies with formula (M3) here above, wherein w is 1, RF$_1$ is —CF$_3$, y is 1 and RF$_2$ is —F and X' is F [formula (M3-A), also called "PSEPVE" (perfluoro-2-(2-fluorosulfonylethoxy)propylvinyl ether)]:

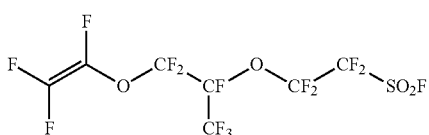
(M3-A)

which can be in its —SO$_2$F form or, preferably, in any of the —SO$_2$X' forms, as above detailed, more preferably in its —SO$_3$H form.

(M4) perfluoroalkoxyvinylether carboxylates of formula (M4):

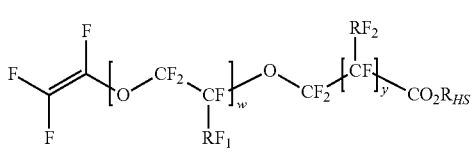

wherein w, y, RF$_1$ and RF$_2$ have the same meaning as above defined, and R$_{HS}$ is a C$_{1-10}$ alkyl or fluoroalkyl group; preferred perfluoroalkoxyvinylether carboxylate complies with formula (M4) here above, wherein w is 0, y is 2, R$_{HS}$ is methyl and RF$_2$ is —F [formula (M4-A)]:

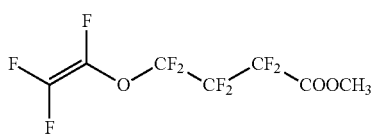

(M5) sulfonated aromatic (per)fluoroolefins of formula (M5):

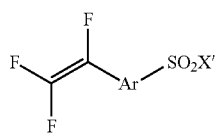

wherein Ar is a C$_{3-15}$ aromatic or heteroaromatic moiety and X' is chosen among halogens (Cl, F, Br, I), —O$^-$M$^+$, wherein M$^+$ is a cation selected among H$^+$, NH$_4^+$, K$^+$, Li$^+$, Na$^+$, or mixtures thereof, preferably X'=—O$^-$H$^+$; and (M6) mixtures thereof.

Optionally, in addition to recurring units derived from fluorinated monomer(s) and functional monomer(s), the (per)fluoroionomer (I) can further comprise recurring units derived from at least one bis-olefin chosen among those of formulae:

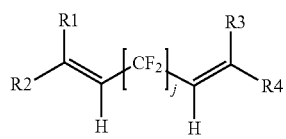

wherein j is an integer between 2 and 10, preferably between 4 and 8, and R1, R2, R3, R4, equal or different from each other, are H, F or C$_{1-5}$ alkyl or (per)fluoroalkyl group;

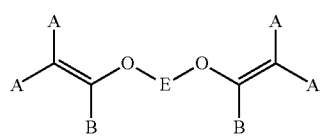

wherein each of A, equal or different from each other and at each occurrence, is independently selected from F, Cl, and H; each of B, equal or different from each other and at each occurrence, is independently selected from F, Cl, H and OR$_B$, wherein R$_B$ is a branched or straight chain alkyl radical which can be partially, substantially or completely fluorinated or chlorinated; E is a divalent group having 2 to 10 carbon atom, optionally fluorinated, which may be inserted with ether linkages; preferably E is a —(CF$_2$)$_m$— group, with m being an integer from 3 to 5; a preferred bis-olefin of (OF-2) type is F$_2$C=CF—O—(CF$_2$)$_5$—O—CF=CF$_2$.

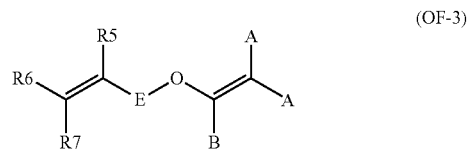

wherein E, A and B have the same meaning as above defined; R5, R6, R7, equal or different from each other, are H, F or C$_{1-5}$ alkyl or (per)fluoroalkyl group.

Should the (per)fluoroionomer (I) comprise recurring units derived from a bis-olefin as above defined, it advantageously comprises said recurring units in an amount in the range from 0.01 to 5% by moles, with respect to all recurring units of fluoroionomer.

Preferably, the (per)fluoroionomer (I) is free from recurring units derived from bis-olefins as above specified.

The (per)fluoroionomer (I) is preferably a per(halo)fluoroionomer.

For the purpose of the invention, the term "per(halo) fluoroionomer" is intended to denote a fluoroionomer substantially free of hydrogen atoms.

The term "substantially free of hydrogen atom" is understood to mean that the per(halo)fluoroionomer consists essentially of:
 recurring units derived from one or more than one ethylenically unsaturated monomer comprising at least one fluorine atom and free from hydrogen atoms (per(halo) fluoromonomer, hereinafter); and
 recurring units derived from one or more than one ethylenically unsaturated monomer comprising at least one fluorine atom and at least one ion exchange group, and free from hydrogen atoms (except those optionally comprised in the ion exchange group) (functional per (halo)fluoromonomer, hereinafter).

The per(halo)fluoromonomer and the functional per(halo) fluoromonomer may be the same monomer or may be different monomers, that is to say that the per(halo)fluoroionomer can be a homopolymer of a functional per(halo) fluoromonomer, or can be a copolymer of one or more than one per(halo)fluoromonomer and one or more than one functional per(halo)fluoromonomer.

Preferred fluoroionomer (I) is chosen among per(halo) fluoroionomer comprising (preferably consisting essentially at) recurring units derived from at least one functional per(halo)fluoromonomer and at least one per(halo)fluoromonomer chosen among:
 C$_3$-C$_8$ perfluoroolefins, preferably tetrafluoroethylene (TFE) and/or hexafluoropropylene (HFP);
 chloro- and/or bromo- and/or iodo-C$_2$-C$_6$ per(halo)fluoroolefins, like chlorotrifluoroethylene (CTFE) and/or bromotrifluoroethylene;

perfluoroalkylvinylethers (PAVE) complying with formula $CF_2=CFOR_{f1}$ in which $R_{f1}$ is a $C_1$-$C_6$ perfluoroalkyl, e.g. $—CF_3$, $—C_2F_5$, $—C_3F_7$;

perfluoro-oxyalkylvinylethers complying with formula $CF_2=CFOX_0$, in which $X_0$ is a $C_1$-$C_{12}$ perfluorooxyalkyl having one or more ether groups, like perfluoro-2-propoxy-propyl.

More preferred (per)fluoroionomer (I) is chosen among tetrafluoroethylene (TFE) copolymers comprising (preferably consisting essentially at) recurring units derived from at least one functional per(halo)fluoromonomer as above defined.

Preferred functional per(halo)fluoromonomers are notably sulfonated perfluorovinylethers of formula (M2) as above detailed and sulfonated perfluoroalkoxyvinylethers of formula (M3) as above detailed, and mixtures thereof.

Even more preferred (per)fluoroionomer (I) is selected among TFE copolymers comprising (preferably consisting essentially at) recurring units derived from PSEPVE (formula M3-A here above) and/or SFVE (formula M2-D here above), in their $—SO_2F$ or $—SO_2X"$ form, wherein $X"$ is chosen among halogens (Cl, Br, I), $—O^-M^+$, wherein $M^+$ is a cation selected among $H^+$, $NH_4^+$, $K^+$, $Li^+$, $Na^+$, or mixtures thereof.

Still more preferred (per)fluoroionomer (I) is selected among TFE copolymers comprising (preferably consisting essentially of):
from 5 to 30% by moles of recurring units derived from PSEPVE and/or SFVE, in their $—SO_2F$ or $—SO_2X"$ form, wherein $X"$ is chosen among halogens (Cl, Br, I), $—O^-M^+$, wherein $M^+$ is a cation selected among $H^+$, $NH_4^+$, $K^+$, $Li^+$, $Na^+$, or mixtures thereof; and
from 95 to 70% by moles of recurring units derived from TFE.

According to a preferred embodiment of the invention, the (per)fluoroionomer (I) is chosen among TFE copolymers as above described wherein the functional monomer is SFVE, in its $—SO_2F$ or $—SO_2X$ "form, wherein $X"$ is chosen among halogens (Cl, Br, I), $—O^-M^+$, wherein M is a cation selected among $H^+$, $NH_4^+$, $K^+$, $Li^+$, $Na^+$, or mixtures thereof.

The process of the invention comprises submitting said (per)fluoroionomer (I) to at least one of:
(A) fluorination with elemental fluorine;
(B) treatment with a polar organic solvent [solvent (S)]; and separating said (per)fluoroionomer (I) for recovering a purified (per)fluoroionomer (I), typically in dry form.

Fluorination of said (per)fluoroionomer (I) can be carried out following standard techniques known in the art. Among suitable techniques, mention can be made of those described in EP 1635412 A (ASAHI GLASS CO LTD) 15 Mar. 2006, EP 1666508 A (ASAHI CHEMICAL CORP) 7 Jun. 2006, U.S. Pat. No. 7,214,740 (3M INNOVATIVE PROPERTIES CO) 9 Nov. 2006, EP 1256591 A (AUSIMONT SPA).

Preferably, fluorination (A) is carried out by contacting the (per)fluoroionomer (I) as above detailed with fluorine at a temperature of at least 50° C.

Generally, the (per)fluoroionomer (I) is used in said fluorination (A) under the form of powder having an average particle size of 1 to 1000 µm, preferably of 5 to 800 µm, more preferably of 10 to 500 µm. Said powder is generally obtained from coagulation of the as-polymerized latex of (per)fluoroionomer (I) from water-based polymerization, such as emulsion, including micro-emulsion, dispersion polymerization and the like.

Typically, said (per)fluoroionomer (I) is exposed to a gaseous stream comprising fluorine in a reaction vessel. While a gaseous stream consisting essentially of fluorine can be used, it is generally preferred to use mixtures of fluorine with suitable inert gases, such as notably, nitrogen, argon, helium, and the like, a mixture $F_2/N_2$ being typically preferred.

Typically, pressure is maintained between 0.1 and 5 bar, preferably between 0.5 and 2.5 bar, more preferably between 1 and 1.5 bar.

Generally, purified (per)fluoroionomer (I) is recovered from fluorination (A) by venting unreacted fluorine and, optionally, purging with a flow of an inert gas (nitrogen, argon, helium, preferably nitrogen).

Optionally, purified (per)fluoroionomer (I) from fluorination (A) as above detailed can be further rinsed with water for eliminating HF or other water-soluble fluorides possibly formed during fluorination. Standard drying techniques can be applied for obtaining (per)fluoroionomer (I) in dry form.

Should the (per)fluoroionomer (I) have cation exchange groups of formula $—SO_2X$, wherein X is chosen among halogens (Cl, F, Br, I), $—O^-M^+$, wherein $M^+$ is a cation selected among $H^+$, $NH_4^+$, $K^+$, $Li^+$, $Na^+$, or mixtures thereof, said (per)fluoroionomer (I) is preferably submitted to fluorination treatment of step (A) in its $—SO_2F$ form.

According to treatment with a polar organic solvent [solvent (S)] (B), as above detailed, (per)fluoroionomer (I) is advantageously contacted under the form of powder having an average particle size of 1 to 1000 µm, preferably of 5 to 800 µm, more preferably of 10 to 500 µm, with said solvent (S).

Said powder is generally obtained from coagulation of the as-polymerized latex of (per)fluoroionomer (I) from water-based polymerization, such as emulsion, including micro-emulsion, dispersion polymerization and the like.

The expression 'polar organic solvent [solvent (S)]' is intended to denote an organic solvent which has a dielectric constant of at least 15. Solvent (S) can be protic or aprotic, that is to say that it may or may not comprise acidic hydrogen.

Among polar aprotic organic solvents suitable for step (B) of the present invention, mention can be notably made of ketones, like acetone, methyethylketone, esters, like methylacetate, dimethylcarbonate, diethylcarbonate, ethylacetate, nitriles, like acetonitrile, sulphoxides, like dimethylsulfoxide, amides, like N,N-dimethylformamide, N,N-dimethylacetamide.

Among polar protic organic solvents suitable for step (B) of the present invention, mention can be notably made of alcohols, such as propanol, ethanol, methanol; polyols, such as ethylene glycol, diethylene glycols; carboxylic acids, like formic acid; amides, such as formamide.

Solvents (S) which are fully miscible with water are generally preferred.

It is also understood that step (B) can be carried out contacting the (per)fluoroionomer (I) with mixtures of more than one solvent (S) or with a mixture of water and solvent (S).

Typically, the (per)fluoroionomer (I) is contacted with the solvent (S) under stirring.

Temperature is not particularly limited, provided that enable solvent (S) to remain in the liquid state. Typically, treatment (B) is carried out at a temperature of 0 to 150° C., including room temperature.

Should the (per)fluoroionomer (I) have cation exchange groups of formula $—SO_2X$, wherein X is chosen among halogens (Cl, F, Br, I), $—O^-M^+$, wherein $M^+$ is a cation selected among $H^+$, $NH_4^+$, $K^+$, $Li^+$, $Na^+$, or mixtures thereof, said (per)fluoroionomer (I) is preferably submitted to treatment of step (B) in its —SO$_2$F form.

According to such preferred embodiment, when the solvent (S) is used in combination with water, an acid is typically added for setting a pH of less than 3. Under these conditions, groups —SO$_2$F, as above detailed, are advantageously stable against hydrolysis.

Separation of the purified (per)fluoroionomer (I) from solvent (S) is carried out using standard techniques, including filtration, centrifugation, sedimentation, and the like.

It is also generally preferred to further contact said purified (per)fluoroionomer (I) after step (B) with water; washing with water typically advantageously enables purification of the (per)fluoroionomer (I) from residues of solvent (S). Standard drying techniques can be applied for obtaining (per)fluoroionomer (I) in dry form.

According to the process of the invention, the (per)fluoroionomer (I) is submitted to at least one of treatments (A) and (B) as above detailed. Also, while the (per)fluoroionomer (I) can be treated either by fluorination (A) or by contact with solvent (S) (B), it is also understood that (per)fluoroionomer (I) can be submitted to both treatments according to the invention.

It is nevertheless generally understood that better results in terms of achievable viscosity of liquid composition therefrom are obtained wherein the process of the invention comprises fluorination (A) of the (per)fluoroionomer (I), possibly in combination with solvent (S) treatment (B). In this latter embodiment, it is generally preferred to first submit the (per)fluoropolymer (I) to the solvent (S) treatment (B) as above detailed and then submitting the so obtained (per)fluoroionomer (I) to fluorination (A).

The process of the invention further comprises dispersing said purified (per)fluoroionomer (I) from treatment (A) and/or (B) at a temperature of at least 150° C. in an aqueous medium substantially free from organic solvents, for obtaining an aqueous composition.

Said dispersion/dissolution is carried out at a temperature of at least 150° C., preferably of at least 200° C., more preferably of at least 230° C. This dispersion/dissolution is generally carried out under stirring in an autoclave.

So-obtained aqueous composition generally comprises the (per)fluoroionomer (I) under dissolved or dispersed form. The term 'dissolved form' is intended to denote a 'true' solution of the (per)fluoroionomer (I). The wording 'dispersed form' is hereby intended to denote a colloidal suspension of (per)fluoroionomer, whereby particles of fluoroionomer of average particle size of generally less than 500 nm are stably suspended with no settlement phenomena when left in unperturbed state.

In case of dispersed form, the (per)fluoroionomer (I) advantageously possesses an average particle size of 1 to 500 nm, preferably of 1 to 250 nm, even more preferably from 1 to 100 nm.

The expression 'substantially free from organic solvents' is intended to denote an aqueous medium which comprises no more than 1% wt, preferably no more than 0.5% wt, more preferably no more than 0.05% wt, most preferably no more than 0.01% wt (with respect to the total weight of the aqueous medium) of organic solvent.

It is generally preferred that a preliminary hydrolysis step is carried out after treatment (A) and/or (B) as above detailed, for providing the (per)fluoroionomer in its salified form. For the avoidance of doubt, the expression 'salified form' within the context of the present invention is intended to mean that cations different from H$^+$ are bound to the cation exchange groups of the (per)fluoroionomer (I).

Should the (per)fluoroionomer (I) comprise cation exchange groups of formula —SO$_2$X, wherein X is chosen among halogens (Cl, F, Br, I), —O$^-$M$^+$, wherein M$^+$ is a cation selected among H$^+$, NH$_4^+$, K$^+$, Li$^+$, Na$^+$, or mixtures thereof, it is hereby preferred that these cation exchange groups in salified form comply with formula —SO$_3^-$M$^+$, wherein M$^+$ is a cation selected among NH$_4^+$, K$^+$, Li$^+$, Na$^+$, or mixtures thereof.

The process of the invention further comprises adding to said aqueous composition at least one polar organic solvent [solvent (S')].

The expression 'polar organic solvent [solvent (S')]' is intended to denote an organic solvent having a dielectric constant of at least 15. Solvent (S) and solvent (S') can be same solvent or can be different solvents.

Among solvents (S'), those protic are preferred. Hydroxyl group-containing solvents (S') are more preferably used.

Among more preferred solvents (S') mention can be made of methanol, ethanol, 1-propanol, 2-propanol, 1-butanol, isobutanol, ethylene glycol, and mixtures thereof, most preferred solvents (S') being 1-propanol, 2-propanol, and mixtures thereof.

Very effective solvents (S') are mixtures of 1-propanol and 2-propanol.

The amount of solvent(s) (S') in the liquid medium is not particularly limited. Generally, a weight ratio water/solvent (S') ranging from 90/10 to 10/90, more preferably of 80/20 to 40/60, more preferably of 75/25 to 50/50 is used.

Typically, the process of the invention further comprises a step of upconcentrating the liquid composition for achieving a final (per)fluoroionomer (I) content of at least 9% wt, with respect to the total weight of the composition.

Should the process comprise an upconcentration step, this is generally accomplished by standard techniques, including evaporation, reverse osmosis and the like. This upconcentration step is generally carried out either before or after the addition of solvent (S').

It is nevertheless generally preferred to upconcentrate the liquid composition before adding solvent (S'). According to this preferred embodiment, upconcentrating involves evaporating water. Water can be removed by evaporation at a temperature of at least 30° C., preferably of at least 40° C., more preferably 50° C. Evaporation can be possibly carried out under reduced pressure. As an alternative, a flow of dry inert gas, typically air or nitrogen, can be used for evaporating water.

Optionally, the process of the invention can further comprise adding to the liquid composition one or more additional ingredients.

Among ingredients which can be introduced in the liquid composition manufactured in the process of the invention, mention can be made of non-ionic surfactants like TRITON® surfactant, TERGITOL® surfactant; of high boiling point organic additives, like triethylphosphate (TEP), N-methyl-pyrrolidone, ethylene carbonate (EC), dimethylsulphoxide (DMSO), N,N-dimethylformamide (DMF), N,N-dimethylacetamide (DMAc).

Still an object of the invention, is an aqueous liquid composition having a surface tension of 15 to 30 mN/m, when determined at 25° C., said composition comprising:

at least one (per)fluoroionomer (I), as above described, in an amount of at least 9% wt, with respect to the total weight of the liquid composition;

at least one polar organic solvent [solvent (S')], as above described; and water, wherein said dispersion possesses a liquid viscosity when determined at 25° C. at a shear rate of 100 sec$^{-1}$, of:

less than 100 Cpoise, when the (per)fluoroionomer (I) concentration is of at most 15% wt, with respect to the total weight of the liquid composition;

less than 150 Cpoise, when the (per)fluoroionomer (I) concentration is of more than 15% wt and at most 30% wt, with respect to the total weight of the liquid composition;

less than 200 Cpoise, when the (per)fluoroionomer (I) concentration is of more than 30% wt, with respect to the total weight of the liquid composition.

The Applicant has found that the particular combination of low surface tension, high solid content and low liquid viscosity makes these liquid compositions particularly suitable for being used in impregnating inert porous support, yielding in single-step impregnation uniform composites, with extremely even distribution of the impregnated (per) fluoroionomer (I) through the entire thickness of the composite membrane and high (per)fluoroionomer content in the support porosity.

The aqueous liquid compositions of the invention are advantageously manufactured via the process as above described.

The surface tension of the liquid composition of the invention is measured according to ASTM D 1331-89 standard, method A.

The aqueous liquid composition of the invention has a surface tension of preferably 18 to 28 mN/m, preferably of 22 to 27.5 mN/m, more preferably of 23 to 26 mN/m, when determined at 25° C.

The viscosity of the aqueous liquid composition of the invention is typically determined using a dynamic mechanic rheometer (e.g. a Rheometric RFS III), using a 'couette' geometry (i.e. concentrically assembled cylinders) in steady rate sweep mode at a temperature of 25° C. Value for liquid viscosity hereby referred is the value determined at a shear rate of 100 sec$^{-1}$.

Still another object of the invention is a process for manufacturing a composite membrane, using said aqueous liquid composition.

In particular, the process of the invention involves using the aqueous liquid composition as above detailed for impregnating a porous support.

The aqueous liquid composition of the invention useful in the process of the invention can further comprise additional thermoplastic fluoropolymers, typically having film-ability properties. Among thermoplastic fluoropolymers which can be used in combination with (per)fluoroionomer (I) in the aqueous liquid composition, mention can be made of PFA, ETFE, PCTFE, PDVF, ECTFE, and the like.

The choice of the porous support is not particularly limited. Porous supports which are generally inert under final composite membranes operating conditions will be selected.

Among porous inert materials able to give to composite membranes suitable mechanical properties mention can be made of woven or non-woven polyolefin membranes, in particular polyethylene membranes, and (per)fluoropolymer porous supports. Porous supports of (per)fluoropolymers are generally preferred because of their high chemical inertia.

Biaxially expanded PTFE porous supports (otherwise known as ePTFE membranes) are among preferred supports. These support are notably commercially available under trade names GORE-TEX®, TETRATEX®.

The process of the invention may comprise one or more than one impregnating step(s) in which the porous support is contacted with the liquid composition as above detailed.

The process of the invention typically comprises at least one drying step and/or at least one annealing step.

Drying step is typically intended to remove excess aqueous liquid medium from impregnated support. This step is generally carried out at a temperature of typically 20 to 100° C., preferably from 25 to 90° C., more preferably from 30 to 80° C. An air or inert gas (e.g. nitrogen) flow is generally contacted with the impregnated support during this step.

Should the process comprise multiple impregnating steps, it is generally understood that each of them is followed by a drying step before the porous support is again contacted with the aqueous liquid composition as above detailed for a further impregnating step.

The annealing step, typically conceived for consolidating the impregnated porous support and thus yielding the final composite membrane, is generally carried out at a temperature of at least 120° C., preferably of at least 150° C., more preferably of at least 180° C. Maximum temperature is not particularly limited, provided that the porous support and the (per)fluoroionomer (I) remain stable under these conditions. It is thus generally understood that the annealing is carried out at a temperature not exceeding 270° C., preferably not exceeding 250° C., more preferably not exceeding 220° C. The process of the invention typically comprises only one annealing step, which is generally carried out once completed (all) impregnating/drying sequence(s).

The Applicant has surprisingly found that by using the liquid composition of the invention, it is advantageously possible to obtain composite membranes having an even distribution of the (per)fluoroionomer (I) through the entire thickness of the resulting membrane, with a simple single-step impregnation procedure.

Thus, according to a preferred embodiment of the invention, the process for manufacturing said composite membranes advantageously comprises a single impregnation step.

Said impregnation step can be carried out by immersion of the porous support into an impregnation vessel comprising the aqueous liquid composition, as above detailed, or can be performed by applying suitable amounts of the same by well-known coating techniques such as casting, coating, spraying, brushing and the like, either simultaneously on each side of the porous support or in subsequent coating steps. It is nevertheless generally understood that impregnation by immersion in a vessel comprising the aqueous liquid composition is the technique having provided best results.

Advantageously, the process according to this preferred embodiment of the invention is a continuous process. This continuous process advantageously enables manufacturing a composite membrane roll. Also, preferably, this process advantageously comprises assembling the impregnated support onto a carrier film before submitting the same to the evaporation and annealing steps, as above defined.

The carrier film is generally intended to be used to maintain in dimensionally stable conditions the impregnated porous film during evaporation/annealing phases, so that a better dimensional stability is achieved in the final composite membrane.

Also, this technique has been found to minimize defects or imperfections in composite membranes resulting from pin-holes or other defects in the porous support; actually, the presence of the carrier film has been found to minimize development of fractures in the drying and annealing phases, as typically observed when the porous support is not adhered to a carrier film, but rather e.g. peripherally fixed to a frame.

Examples of carrier films are notably PTFE, ETFE, KAPTON® films, glass fibres PTFE impregnated films and the like.

A particular embodiment of this process is sketched in FIG. 1, wherein (1) and (2) are, respectively, a roll of carrier film and a roll of porous support.

The porous support (4) is driven to immerge in an impregnation vessel (3) comprising the liquid composition as above detailed. The impregnated porous support (5) is made to adhere to a carrier film (7) and the so assembled entity (7) is driven into a continuous oven (8) made of two separated sections (9) and (10), the former maintained at a first temperature T1 for achieving drying of the impregnated support and the latter maintained at a second temperature T2 for performing annealing.

The dried and annealed assembly (11) is then separated into the carrier film (12), which is then re-wound as a roll (14) and recycled, and the composite membrane (13), which is also wound to provide a roll (15) of composite membrane. This last step can be carried out during composite membrane manufacture or performed on a separated device prior to use the composite membrane.

The composite membrane (13) can be further submitted to additional steps, including notably, rinsing steps for further removal of organic pollutants, acid hydrolysis steps for converting cation exchange groups in their acidic form, and the like.

Composite membranes obtained from the process of the invention are a further object of the invention.

Thus, the invention is also directed to a composite membrane comprising:
  a porous support (as above detailed); and,
  a (per)fluoroionomer (I) (as above defined) impregnated therein, said (per)fluoroionomer having cation exchange groups of formula —SO$_2$X,
  wherein X is chosen among halogens (Cl, F, Br, I), —O$^-$M$^+$, wherein M$^+$ is a cation selected among H$^+$, NH$_4^+$, K$^+$, Li$^+$, Na$^+$, or mixtures thereof,
  wherein said composite membranes comprises two external peripheral regions essentially free from porous support, each of said peripheral regions having a first average thickness ($T_{out}$) and yielding, when analysed by Energy Dispersive X-Ray Spectroscopy (EDS), a first average intensity of the signal relative to sulphur ($I_S^{out}$) and an inner region substantially comprising both porous support and (per)fluoroionomer (I), said inner region having a second average thickness ($T_{in}$) and yielding when analysed by EDS, a second average intensity of the signal relative to sulphur ($I_S^{in}$),
  wherein the ratio:

$$R_T = \frac{T_{in}}{T_{in} + 2 \cdot T_{out}}$$

is at least 0.3, and
  wherein the ratio:

$$R_S = \frac{I_S^{in}}{I_S^{out}}$$

is at least 0.4.

The Applicant has found that only by means of the aqueous liquid composition of the invention is indeed possible manufacturing composite membrane simultaneously fulfilling above mentioned requirements of $R_T$ and $R_S$.

Said composite membrane can be manufactured by means of the process of the invention, notably using the liquid compositions as above defined.

The expression 'peripheral regions essentially free from porous support' is intended, to the purposes of the present invention, to denote superficial layers wherein only the impregnating material is essentially present (i.e. the (per)fluoroionomer (I) as above detailed, possibly in combination with one or more thermoplastic fluoropolymers as above mentioned), i.e. wherein said material represents at least 95% wt, preferably of at least 99% wt of the weight of this layer. The peripheral regions as above detailed typically comprise the (per)fluoroiononomer (I) in an amount of at least 95% wt, preferably of at least 99% wt. Typically said layers consists essentially only of (per)fluoroionomer (I), that is to say that, if any other component is present, said other component does not substantially modify properties of this layer.

Inner region is actually the region wherein we simultaneously find the porous support and impregnating material comprising (typically consisting essentially of) the (per)fluoroionomer (I), which is generally present in its porosity. The porosity of the support is thus typically at least partially filled with said (per)fluoroionomer (I).

The two parameters above mentioned $R_T$ and $R_S$ actually are understood to qualify the composite membrane as possessing thin peripheral regions and substantially homogenous and even distribution of the (per)fluoroionomer (I) among the entire thickness of the composite membrane.

Above mentioned boundary for ratio $R_T$ is intended to specify that in the composite membrane of the invention the inner region represents a significant fraction of the entire thickness of the composite membrane. The composite membrane of the invention preferably has a $R_T$ value of at least 0.40, more preferably of at least 0.55.

Thus, for a given porous support thickness, a high value of $R_T$ indeed corresponds to a low total membrane thickness, usually preferred for achieving lower ohmic drop, higher transport rate. Also, this value would correspond to a minimization of whole costs of the membrane, as the contribution from the (per)fluoroionomer (I) is considered indeed the most significant, per unit of membrane surface.

In particular, ratio $R_S$ as above defined, is directly proportional to the ratio between concentration of the (per)fluoroionomer in the inner region and same concentration in the peripheral region. The composite membrane of the invention preferably has a $R_S$ value of at least 0.45, more preferably of at least 0.50.

This actually means that in the composite membrane if the invention, the inner region comprises the (per)fluoroionomer is an amount of at least 40% wt, preferably of at least 45% wt, more preferably of at least 50% wt. The Applicant has found that higher values of $R_S$ parameter (and thus of concentration of (per)fluoroionomer (I) in the inner layer) provide for increased values of membrane conductivity, which is indeed a very valuable property for the use of said membranes in electrochemical devices, including fuel cells.

PREPARATIVE EXAMPLE 1

General Procedure—Manufacture of a Ionomer Latex and Subsequent Work-up According to Different Methodologies A ionomer latex with EW=800 g/eq (measured by titration) was obtained as described in example 1 of WO 2008/077894 (SOLVAY SOLEXIS SPA [IT]) 7 Mar. 2008.

The latex was kept under nitrogen bubbling for 16 hours to strip away residual monomers from the polymerization, and then frozen in a plastic tank for 48 hours. After melting of the water, the coagulated ionomer was washed several times with demineralized water and dried in oven at 80° C. for 48 hours obtaining a dry powder of ionomer precursor. The polymer was split into 5 parts of equal quantity that followed the different processing routes below:

(a) reference sample, no additional treatments.

(b) the native ionomer precursor was contacted with a polar solvent (acetonitrile) at ambient temperature for 30 minutes with moderate stirring (8 liters of acetonitrile per Kg of polymer) in a closed reactor. Then the polymer was washed several times with water and dried at 80° C. in ventilated oven for 24 hours.

(c) the native ionomer precursor was contacted in a MONEL reactor with a mixture of nitrogen and fluorine gas (50/50) at 80° C. and ambient pressure for 10 hours with a gas flow of 5 Nl/hour, then left in ventilated oven at 80° C. for 24 hours.

(d) the native ionomer precursor was treated with same procedure as described in (b) and then with same procedure as described in (c).

(e) the native ionomer precursor was pelletized with a melt extruder at 280° C.

PREPARATIVE EXAMPLE 2

General Procedure—Manufacture of Ionomer Dispersion in —SO$_3$H Form from Ionomers of Example 1

Ionomers as obtained as described in Ex. 1, under sections (a), (b), (c), (d) were individually treated for 10 hours in NaOH solution (10% by weight of NaOH, 10 liters of solution per Kg of polymer) at 80° C. and then washed several times with demineralized water until the pH of the water is <9. The polymer (e) obtained in EX 1 was separately treated for 100 hours in similar NaOH solution to have complete SO$_2$F to SO$_3$Na conversion. The —SO$_3$Na form polymers were then dried in a ventilated oven at 150° C. for 24 hours. For each sample an amount of 650 g of dry polymers were charged in an AISI316 autoclave with 2100 g of demineralized water and kept under moderate stirring (120 RPM) at 240° C. for 3 hours. After cooling, the obtained dispersions were centrifuged at 10000 RPM (HEMRLE Z36 HK) in order to remove the undissolved polymer fractions. An AISI304 filter was charged with 1000 g of the SO$_3$H form perfluorosulfonic acid polymer powder (EW=870 g/eq), then closed and fed with demineralized water in order to wet the polymer and check eventual leakages. A relief valve had been inserted in the system before the filter inlet regulated at 2 Bars gauge. The polymer dispersions obtained from polymers (a), (b), (c), (d), (e) were fed in the filter by pumping it at a flow of 50 cc/min with a peristaltic pump (Masterflex L/S Cole & Palmer) so that the polymer powder contained in the filter would be contacted in a top-down configuration. After each dispersion, 500 cc of demineralized water were fed in order to push out from the filter residuals of the dispersion and the polymer contained was regenerated by feeding in the filter 2 liters of 20% nitric acid solution, followed by 3 liters of demineralized water.

The polymer dispersions converted to the SO$_3$H form were recovered from the filter and came out partially diluted; evaporation at 60° C. was applied in a stirred glass vessel in order to reach 20% polymer concentration by removing excess water. So obtained native dispersions (before formulation) were submitted to viscosity measurements on a rheometer (HAAKE Viscotester 550 with rotor/cup NV series) and surface tension determination using a tensiometer Lauda Pt-ring. Obtained data are summarized in Table 1:

TABLE 1

| Sample name | Viscosity (25° C., 100 s−1) | Surface tension (25° C.) |
|---|---|---|
| Native dispersion (a) | 6 Cpoise | 49.4 mN/m |
| Native dispersion (b) | 5 Cpoise | 51.2 mN/m |
| Native dispersion (c) | 5 Cpoise | 51.4 mN/m |
| Native dispersion (d) | 5 Cpoise | 51.2 mN/m |
| Native dispersion (e) | 5.5 Cpoise | 49.8 mN/m |

PREPARATIVE EXAMPLE 3

Formulation of Native Dispersions with Solvents

Native dispersions from ionomers (a), (b), (c), (d) and (e) obtained as detailed in EX 2 were submitted to the following treatments:

evaporation at 60° C. in a stirred glass vessel, until reaching 25% polymer concentration, by removing excess water.

addition of solvents (under moderate stirring at ambient pressure) in order to reach the following specifications:

ionomer content by weight: 15% liquid medium composition: water: 55%/1-propanol: 23%/2-propanol: 22%.

So formulated dispersions were submitted to liquid viscosity and surface tension measurements. Results are summarized in Table 2.

TABLE 2

| Sample name | Viscosity (25° C., 100 s$^{-1}$) | Surface tension (25° C.) |
|---|---|---|
| Dispersion (a) (comparative) | 180 Cpoise | 26.0 mN/m |
| Dispersion (b) (according to the invention) | 95 Cpoise | 25.8 mN/m |
| Dispersion (c) (according to the invention) | 84 Cpoise | 25.6 mN/m |
| Dispersion (d) (according to the invention) | 84 Cpoise | 25.6 mN/m |
| Dispersion (e) (comparative) | 176 Cpoise | 25.9 mN/m |

One sample of each dispersion prepared from polymer (a) and (c) was treated in order to have an accelerated ageing of the product by maintaining the same at 60° C. in a closed reactor for 6 hours. After cooling, viscosity had been verified again in the same condition as the test above and resulted:

TABLE 3

| Sample name | Viscosity (25° C., 100 s$^{-1}$) |
|---|---|
| Dispersion (a) aged (comparative) | 649 Cpoise |
| Dispersion (c) aged (according to the invention) | 112 Cpoise |

EXAMPLE 4

Production of Composite Membrane with Dispersion from Polymer (a), (c) and from Diluted Sample TETRATEX® #3101 expanded PTFE porous support from Donaldson, having thickness of 38 micron was used for manufacturing composite membranes via a single step impregnation process using dispersions (a) and (c), as obtained from Ex. 3 (yielding membranes Ma and Mc, respectively), and a further dispersion (a*), obtained from (a) after dilution with the same solvent system (55% water, 23% 1-propanol, 22% 2-propanol) until achieving a ionomer content of 7% wt, a viscosity of 62 Cpoise, and a surface tension of 25.9 mN/m (yielding membrane Ma*).

The impregnation process involved following steps:

a layer of ePTFE porous support (10×10 cm) was engaged onto a PTFE frame;

the porous support/frame assembly was dipped for 120 sec in the dispersion while maintained in vertical position;

said impregnated assembly was then left in vertical position at ambient temperature for 5 minutes for removing by gravity excess of liquid dispersion said assembly was then maintained in a ventilated oven first at 80° C. for 30 minutes (solvent evaporation step), then at 170° C. for 30 minutes (annealing step)

assembly was finally removed from oven, cooled and composite membrane cut off therefrom.

Similarly a fourth membrane (Ma**) was prepared by using diluted dispersion a*, but applying multiple impregnation steps before annealing; after first evaporation step, the impregnated assembly was immersed again in the dispersion for 120 seconds, then left 5 minutes in vertical position, and solvent was again evaporated in ventilated oven. The multiple steps process was repeated until five subsequent impregnation steps; after fifth evaporation, annealing thermal treatment as above described was carried out, as well as work-up as above detailed. All the membranes prepared appeared completely transparent without traces of white/opaque parts.

General Method for the Determination of $R_T$ and $R_S$ by SEM (Scanning Electron Microscope) and EDS (Energy Dispersive Spectrometry)

The membranes were analyzed with SEM microscope in their section (crio-fracture in liquid nitrogen) in order to measure the total membrane thickness, the thickness of inner layer (impregnated porous support) and the thickness of the two peripheral layers. RT value was thus determined as ratio between the average thickness of the inner region and the whole thickness of the composite membrane.

$R_S$ measurements were performed by microanalysis using a Scanning Electron Microscope (SEM) (model Cambridge S200 with conventional W filament) equipped with INCA EDS Microanalysis System by Oxford. Sulphur maximum peak intensity in the EDS Spectra were recorded and corrected for background.

Average values for the peripheral regions and average values for the inner region were determined and used for evaluating RS value.

Results obtained for membranes (Ma), (Mc), (Ma*) and (Ma**) are summarized here below.

TABLE 4

| Sample | Membrane thickness (μm) | Inner region $T_{in}$ (μm) | Peripheral region $T_{out}$ (μm) | $R_T$ | $R_S$ |
|---|---|---|---|---|---|
| (Ma) | 41.5 | 11.5 | 15 | 0.27 | 0.46 |
| (Mc) | 22 | 13 | 4.5 | 0.59 | 0.53 |
| (Ma*) | 10 | 9 | 0.5 | 0.90 | 0.31 |
| (Ma**) | 17 | 10 | 3.5 | 0.58 | 0.37 |

It can be outlined that only using the liquid composition of the invention, it is indeed possible to obtain composite membrane simultaneously having a substantial thickness of impregnated support with respect to the entire thickness and a high concentration of (per)fluoroionomer in said inner region.

EXAMPLE 5

Preparation of a Supported Membrane Roll Using Dispersion(c) Prepared in Example 2

TETRATEX® #3101 expanded PTFE porous support from Donaldson, having thickness of 38 micron, was used for manufacturing composite membranes via a single step impregnation process using a dispersion (c), as obtained from Ex. 3.

Thus, a roll of porous ePTFE (width 400 mm) was un-wound to pass into a vessel containing 15 liters of ionomer dispersion. The dispersion contained in the impregnation vessel was kept well mixed during the process by a recirculation pump at ambient temperature.

A carrier film (width 500 mm), namely, a Tac Cast 10, 600 g/m², nominal thickness 0.275 mm from Taconic International (Ireland), was made to adhere to the impregnated porous support and the assembly was made to move at a constant speed of 4 cm/min.

Two engines, the former at the beginning of the line, where the carrier film was un-wound, the latter at the end of the line after the oven, maintained the carrier film/impregnated support assembly to the required speed of 4 cm/min and the desired tension.

The assembly was then moved into an oven, divided into two sections, the first kept at 80° C. with air recirculation (for solvents evaporation), the second kept at 190° C. (for membrane annealing).

The membrane was then separated from the support and the measured average thickness was 22 micron. The membrane appeared completely transparent and without visible defects. A roll of one hundred linear meters of reinforced membrane were produced.

The same process was similarly repeated with a TETRATEX® #1326 17 micron thick roll obtaining a membrane with a final thickness of 8 micron, completely transparent and without visible defects.

The invention claimed is:

1. An aqueous liquid composition having a surface tension of 15 to 30 mN/m, when determined at 25° C., said composition comprising:

at least one (per)fluoroionomer (I), in an amount of at least 9% wt, with respect to the total weight of the liquid composition;

at least one polar organic solvent (S'); and
water,
wherein said composition is a dispersion possessing a liquid viscosity when determined at 25° C. at a shear rate of 100 sec$^{-1}$, of:
   less than 100 cP, when the (per)fluoroionomer (I) concentration is of at most 15% wt, with respect to the total weight of the liquid composition;
   less than 150 cP, when the (per)fluoroionomer (I) concentration is of more than 15% wt and at most 30% wt, with respect to the total weight of the liquid composition;
   less than 200 cP, when the (per)fluoroionomer (I) concentration is of more than 30% wt, with respect to the total weight of the liquid composition.

2. The aqueous liquid composition of claim 1, wherein said (per)fluoroionomer (I) comprises recurring units derived from at least one fluorinated functional monomer selected from:
(M1) sulfonated perfluoroolefins of formula (M1):

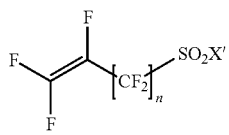
(M1)

wherein n is an integer between 0 and 6 and X' is selected from the group consisting of halogens, wherein said halogens are selected from Cl, F, Br, and I,
—O$^-$M$^+$, wherein M$^+$ is a cation selected from the group consisting of H$^+$, NH$_4^+$, K$^+$, Li$^+$, Na$^+$, and mixtures thereof;
(M2) sulfonated perfluorovinylethers of formula (M2):

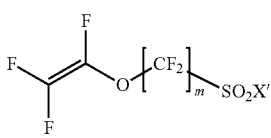
(M2)

wherein m is an integer between 1 and 10 and X' is selected from the group consisting of halogens, wherein said halogens are selected from Cl, F, Br, and I,
—O$^-$M$^+$, wherein M$^+$ is a cation selected from the group consisting of H$^+$, NH$_4^+$, K$^+$, Li$^+$, Na$^+$, and mixtures thereof;
(M3) sulfonated perfluoroalkoxyvinylethers of formula (M3):

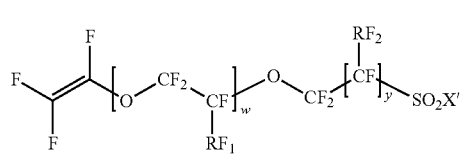
(M3)

wherein w is an integer between 0 and 2, RF$_1$ and RF$_2$, equal or different from each other and at each occurrence, are independently —F, —Cl or a C$_{1-10}$ perfluoroalkyl group, optionally substituted with one or more ether oxygens, y is an integer between 0 and 6 and X' is selected from the group consisting of halogens, wherein said halogens are selected from Cl, F, Br, and I, —O$^-$M$^+$, wherein M$^+$ is a cation selected from the group consisting of H$^+$, NH$_4^+$, K$^+$, Li$^+$, Na$^+$, and mixtures thereof;
(M4) perfluoroalkoxyvinylether carboxylates of formula (M4):

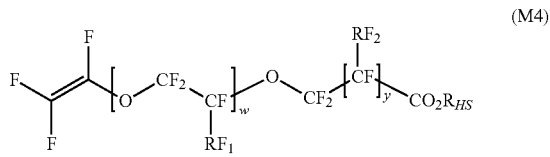
(M4)

wherein w is an integer between 0 and 2, RF$_1$ and RF$_2$, equal or different from each other and at each occurrence, are independently —F, —Cl or a C$_{1-10}$ perfluoroalkyl group, optionally substituted with one or more ether oxygens, y is an integer between 0 and 6, and R$_{HS}$ is a C$_{1-10}$ alkyl or fluoroalkyl group;
(M5) sulfonated aromatic (per)fluoroolefins of formula (M5):

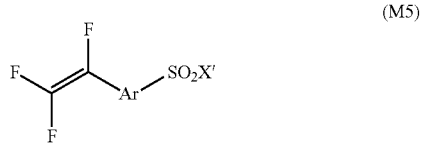
(M5)

wherein Ar is a C$_{3-15}$ aromatic or heteroaromatic moiety and X' is selected from the group consisting of halogens, wherein said halogens are selected from Cl, F, Br, and I, —O$^-$M$^+$, wherein M$^+$ is a cation selected from the group consisting of H$^+$, NH$_4^+$, K$^+$, Na$^+$, and mixtures thereof; and
(M6) mixtures thereof.

3. The aqueous liquid composition of claim 2, wherein said (per)fluoroionomer (I) is selected from TFE copolymers comprising:
   from 5 to 30% by moles of recurring units derived from at least one monomer selected from perfluoro-2-(2-fluorosulfonylethoxy)propylvinyl ether (PSEPVE) of formula (M3-A):

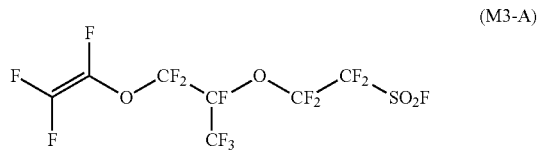
(M3-A)

and
perfuoro-5-sulphonylfluoride-3-oxa-1-pentene (SFVE) of formula (M2-D):

(M2-D)

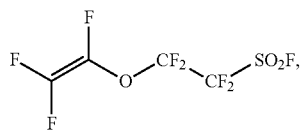

in their —SO$_2$F or —SO$_2$X" form, wherein X" is selected from the group consisting of halogens, wherein said halogens are selected from Cl, Br, and I, —O$^-$M$^+$, wherein M$^+$ is a cation selected from the group consisting of H$^+$, NH$_4^+$, K$^+$, Li$^+$, Na$^+$, and mixtures thereof; and from 95 to 70% by moles of recurring units derived from tetrafluoroethylene (TFE).

4. The aqueous liquid composition according to claim 1, wherein solvent (S') is selected from the group consisting of methanol, ethanol, 1-propanol, 2-propanol, 1-butanol, isobutanol, ethylene glycol and mixtures thereof.

5. A process for manufacturing a composite membrane, the process comprising contacting a porous support with the liquid composition according to claim 1.

6. The process of claim 5, wherein said process comprises a single impregnation step and is operated in continuum.

7. The process of claim 6, said process comprising assembling the impregnated support onto a carrier film before submitting the same to the evaporation and annealing.

8. A composite membrane comprising:
a porous support; and,
a (per)fluoroionomer (I) impregnated therein, said (per)fluoroionomer having cation exchange groups of formula —SO$_2$X, wherein X is selected from the group consisting of halogens, wherein said halogens are selected from Cl, F, Br, and I,
—O$^-$M$^+$, wherein M$^+$ is a cation selected from the group consisting of H$^+$, NH$_4^+$, K$^+$, Li$^+$, Na$^+$, and mixtures thereof,
wherein said composite membranes comprises two external peripheral regions essentially free from porous support, each of said peripheral regions having a first average thickness (T$_{out}$) and yielding, when analysed by Energy Dispersive X-Ray Spectroscopy (EDS), a first average intensity of the signal relative to sulphur (I$_S^{out}$) and an inner region substantially comprising both porous support and (per)fluoroionomer (I), said inner region having a second average thickness (T$_{in}$) and yielding when analysed by EDS, a second average intensity of the signal relative to sulphur (I$_S^{in}$),
wherein the ratio:

$$R_T = \frac{T_{in}}{T_{in} + 2 \cdot T_{out}}$$

is at least 0.3, and
wherein the ratio:

$$R_S = \frac{I_S^{in}}{I_S^{out}}$$

is at least 0.4.

9. A composite membrane comprising:
a porous support; and,
a (per)fluoroionomer (I) impregnated therein, said (per)fluoroionomer having cation exchange groups of formula —SO$_2$X, wherein X is selected from the group consisting of halogens, wherein said halogens are selected from Cl, F, Br, and I, —O$^-$M$^+$, wherein M$^+$ is a cation selected from the group consisting of H$^+$, NH$_4^+$, K$^+$, Li$^+$, Na$^+$, and mixtures thereof,
wherein said composite membranes comprises two external peripheral regions essentially free from porous support, each of said peripheral regions having a first average thickness (T$_{out}$) and yielding, when analysed by Energy Dispersive X-Ray Spectroscopy (EDS), a first average intensity of the signal relative to sulphur (I$_S^{out}$) and an inner region substantially comprising both porous support and (per)fluoroionomer (I), said inner region having a second average thickness (T$_{in}$) and yielding when analysed by EDS, a second average intensity of the signal relative to sulphur (I$_S^{in}$),
wherein the ratio:

$$R_T = \frac{T_{in}}{T_{in} + 2 \cdot T_{out}}$$

is at least 0.3, and
wherein said inner region comprises said (per)fluoroionomer (I) in an amount of at least 40% wt.

10. The aqueous liquid composition according to claim 4, wherein solvent (S') is selected from the group consisting of 1-propanol, 2-propanol and mixtures thereof.

* * * * *